(12) United States Patent
Yeager et al.

(10) Patent No.: US 9,854,437 B1
(45) Date of Patent: Dec. 26, 2017

(54) APPARATUS, SYSTEM AND METHOD FOR EXCHANGING ENCRYPTED COMMUNICATIONS WITH AN EYE-MOUNTABLE DEVICE

(71) Applicant: VERILY LIFE SCIENCES LLC, Mountain View, CA (US)

(72) Inventors: Daniel J. Yeager, Berkeley, CA (US); Timothy D. Morrison, San Francisco, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 283 days.

(21) Appl. No.: 14/698,471

(22) Filed: Apr. 28, 2015

Related U.S. Application Data

(60) Provisional application No. 62/012,005, filed on Jun. 13, 2014, provisional application No. 62/012,023, filed on Jun. 13, 2014.

(51) Int. Cl.
*H04K 1/00* (2006.01)
*H04W 12/04* (2009.01)
(Continued)

(52) U.S. Cl.
CPC ............ *H04W 12/04* (2013.01); *G02C 7/041* (2013.01); *G02C 7/049* (2013.01); *G02C 7/083* (2013.01);
(Continued)

(58) Field of Classification Search
CPC ...... H04W 12/02; H04W 12/04; G02C 7/083; G02C 7/049; G02C 7/041; H04L 9/0819; H04L 2209/24; H04L 2209/80
(Continued)

(56) References Cited

U.S. PATENT DOCUMENTS 6,415,181 B1    7/2002   Schu et al.
7,311,398 B2   12/2007   Kuiper et al.
(Continued)

FOREIGN PATENT DOCUMENTS

EP        2 518 555 A1    10/2012
WO   WO 2008/120156 A1   10/2008
(Continued)

OTHER PUBLICATIONS

De Smet, J. et al., "Progress toward a liquid crystal contact lens display", Journal of the SID 21/9, DOI: 10.1002/jsid.188, 2014 pp. 399-406.
(Continued)

*Primary Examiner* — Kambiz Zand
*Assistant Examiner* — Aubrey Wyszynski
(74) *Attorney, Agent, or Firm* — Christensen O'Connor Johnson Kindness PLLC

(57) ABSTRACT

Techniques and mechanisms for exchanging encrypted communications wirelessly with an accommodation-capable eye-mountable device (EMD). In an embodiment, a controller of the EMD is configured to encrypt data to be sent from the EMD to an auxiliary device or to decrypt data received by the EMD from the auxiliary device. Cryptographic operations to securely exchange the communications are based on a key value and a vector determined at the EMD. In another embodiment, the auxiliary device operates as a master, and the EMD operates as a slave, at least with respect to enablement of a functionality of the EMD to change an association of a cryptographic key value with a vector.

24 Claims, 10 Drawing Sheets

(51) Int. Cl.
*G02C 7/08* (2006.01)
*G02C 7/04* (2006.01)
*H04L 9/08* (2006.01)

(52) U.S. Cl.
CPC ........ *H04L 9/0819* (2013.01); *H04L 2209/24* (2013.01); *H04L 2209/80* (2013.01)

(58) Field of Classification Search
USPC ........................................................ 380/270
See application file for complete search history.

(56) References Cited

U.S. PATENT DOCUMENTS

| | | | |
|---|---|---|---|
| 8,154,804 | B2 | 4/2012 | Mcginn et al. |
| 8,347,094 | B2* | 1/2013 | Singh .................... H04L 9/0844 713/169 |
| 8,634,145 | B2 | 1/2014 | Pugh et al. |
| 8,636,358 | B2 | 1/2014 | Binder |
| 8,700,144 | B2 | 4/2014 | Arfin et al. |
| 8,970,392 | B2 | 3/2015 | LaLonde et al. |
| 2008/0208335 | A1 | 8/2008 | Blum et al. |
| 2011/0022411 | A1 | 1/2011 | Hjelm et al. |
| 2012/0075712 | A1 | 3/2012 | Pugh et al. |
| 2012/0140167 | A1 | 6/2012 | Blum |
| 2012/0245444 | A1* | 9/2012 | Otis .................... A61B 5/1486 600/345 |
| 2012/0268712 | A1 | 10/2012 | Egan et al. |
| 2013/0245754 | A1 | 9/2013 | Blum et al. |
| 2013/0258275 | A1 | 10/2013 | Toner et al. |
| 2013/0258277 | A1 | 10/2013 | Pugh et al. |
| 2013/0338767 | A1 | 12/2013 | Mazzocchi et al. |
| 2014/0009262 | A1 | 1/2014 | Robertson et al. |
| 2014/0098226 | A1 | 4/2014 | Pletcher et al. |
| 2014/0107447 | A1 | 4/2014 | Liu et al. |
| 2014/0107448 | A1 | 4/2014 | Liu et al. |
| 2014/0192311 | A1 | 7/2014 | Pletcher et al. |
| 2014/0192312 | A1 | 7/2014 | Pletcher et al. |
| 2014/0192318 | A1 | 7/2014 | Guth et al. |
| 2014/0194773 | A1 | 7/2014 | Pletcher et al. |
| 2014/0209481 | A1 | 7/2014 | Pletcher et al. |
| 2014/0213867 | A1 | 7/2014 | Pletcher et al. |
| 2014/0240655 | A1 | 8/2014 | Pugh et al. |
| 2014/0243971 | A1* | 8/2014 | Pugh ........................ G02C 7/04 623/6.22 |
| 2014/0327875 | A1 | 11/2014 | Blum et al. |

FOREIGN PATENT DOCUMENTS

| | | |
|---|---|---|
| WO | WO 2013/086078 A1 | 6/2013 |
| WO | WO 2013/151728 A1 | 10/2013 |
| WO | WO 2014/106330 A1 | 7/2014 |
| WO | WO 2015/001120 A1 | 1/2015 |
| WO | WO 2015/015205 A1 | 2/2015 |

OTHER PUBLICATIONS

De Smet, J. et al., "A Liquid Crystal Based Contact Lens Display Using PEDOT: PSS and Obliquely Evaporated SiO2", Late-News Poster, SID 2012 Digest, pp. 1375-1378.

Milton, H. et al., "Optimization of refractive liquid crystal lenses using an efficient multigrid simulation", May 2012, vol. 20, No. 10, Optics Express, pp. 11159-11165.

Milton, H. et al., "Switchable liquid crystal contact lenses: dynamic vision for the ageing eye", Proc. of SPIE vol. 9004 90040H, 6 pages. Downloaded From: http://spiedigitallibrary.org/ on Mar. 28, 2014.

Milton, H. et al., "Electronic liquid crystal contact lenses for the correction of presbyopia", Apr. 2014, vol. 22, No. 7, DOI:10.1364/OE.22.008035, Optics Express, pp. 8035-8040.

Tremblay, E. et al. "Switchable telescopic contact lens", Jul. 2013, vol. 21, No. 13, DOI:10.1364/OE.21.015980, Optics Express, pp. 15980-15986.

Chernichenko, Dmitry, et al., "Adiabatic Charging of Capacitors by Switched Capacitor Converters with Multiple Target Voltages, 2012 IEEE 27th Convention of Electrical and Electronics Engineers in Israel", (2012), 4 pgs.

* cited by examiner

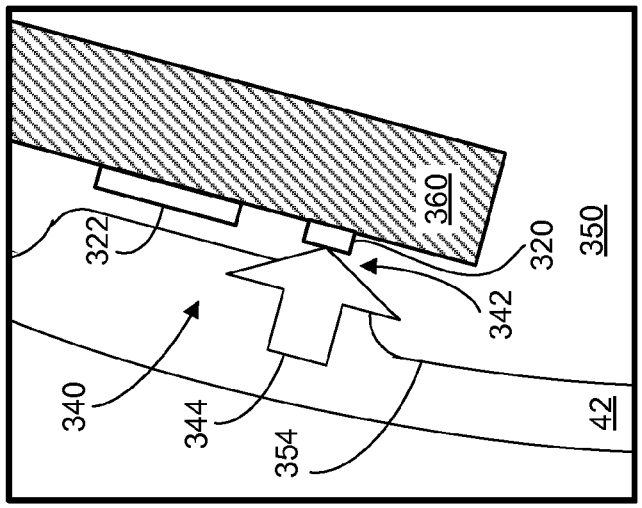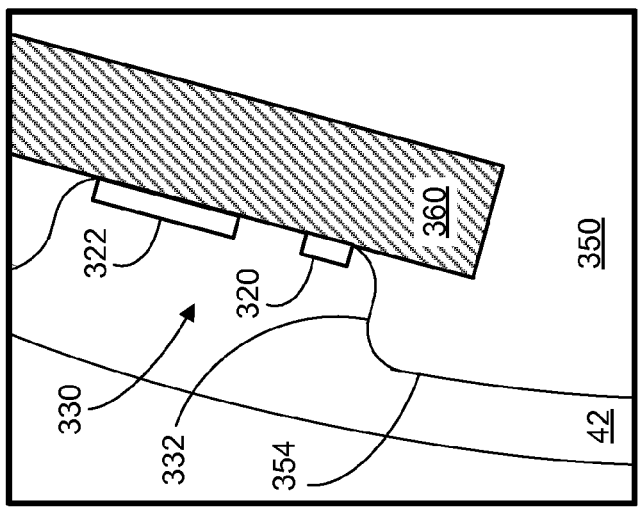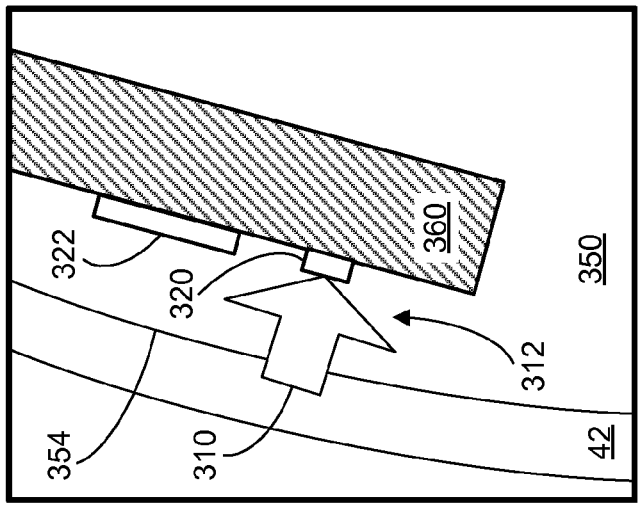

APPARATUS, SYSTEM AND METHOD FOR EXCHANGING ENCRYPTED COMMUNICATIONS WITH AN EYE-MOUNTABLE DEVICE

CROSS REFERENCE TO RELATED APPLICATIONS

This application claims priority under the provisions of 35 U.S.C. §119(e) to U.S. Provisional Application No. 62/012,005 filed Jun. 13, 2014 and to U.S. Provisional Application No. 62/012,023 filed Jun. 13, 2014, both of which contents are hereby incorporated by reference.

BACKGROUND

1. Technical Field

This disclosure relates generally to the field of optics, and in particular but not exclusively, relates to contact lenses.

2. Background Art

Accommodation is a process by which the eye adjusts its focal distance to maintain focus on objects of varying distance. Accommodation is a reflex action, but can be consciously manipulated. Accommodation is controlled by contractions of the ciliary muscle. The ciliary muscle encircles the eye's elastic lens and applies a force on the elastic lens during muscle contractions that change the focal point of the elastic lens.

As an individual ages, the effectiveness of the ciliary muscle can degrade due to Presbyopia or other progressive age-related conditions affecting the focusing strength of the eye. Recent technologies have begun to provide for various devices that operate in or on a human eye to aid the visual focus of a user. For one type of these devices, an accommodating lens includes one or more liquid crystal elements and circuitry to apply an electrical current to change the index of refraction of the one or more elements.

Other eye-mountable devices include alternative mechanisms such as those that sense a concentration of an analyte in a user's tears. As these and other types of eye-mountable devices become more prevalent in the market, the demand for information describing operation of such devices is expected to increase. Physicians, technicians, manufacturers and the users of eye-mountable devices are just some of the agents who will demand safe, efficient access to such information.

BRIEF DESCRIPTION OF THE DRAWINGS

The various embodiments of the present invention are illustrated by way of example, and not by way of limitation, in the figures of the accompanying drawings and in which:

FIGS. 3A through 3C illustrate features of respective eye-mountable devices each comprising an analyte sensor and cryptographic communication logic according to a corresponding embodiment.

DETAILED DESCRIPTION

Figure 1:
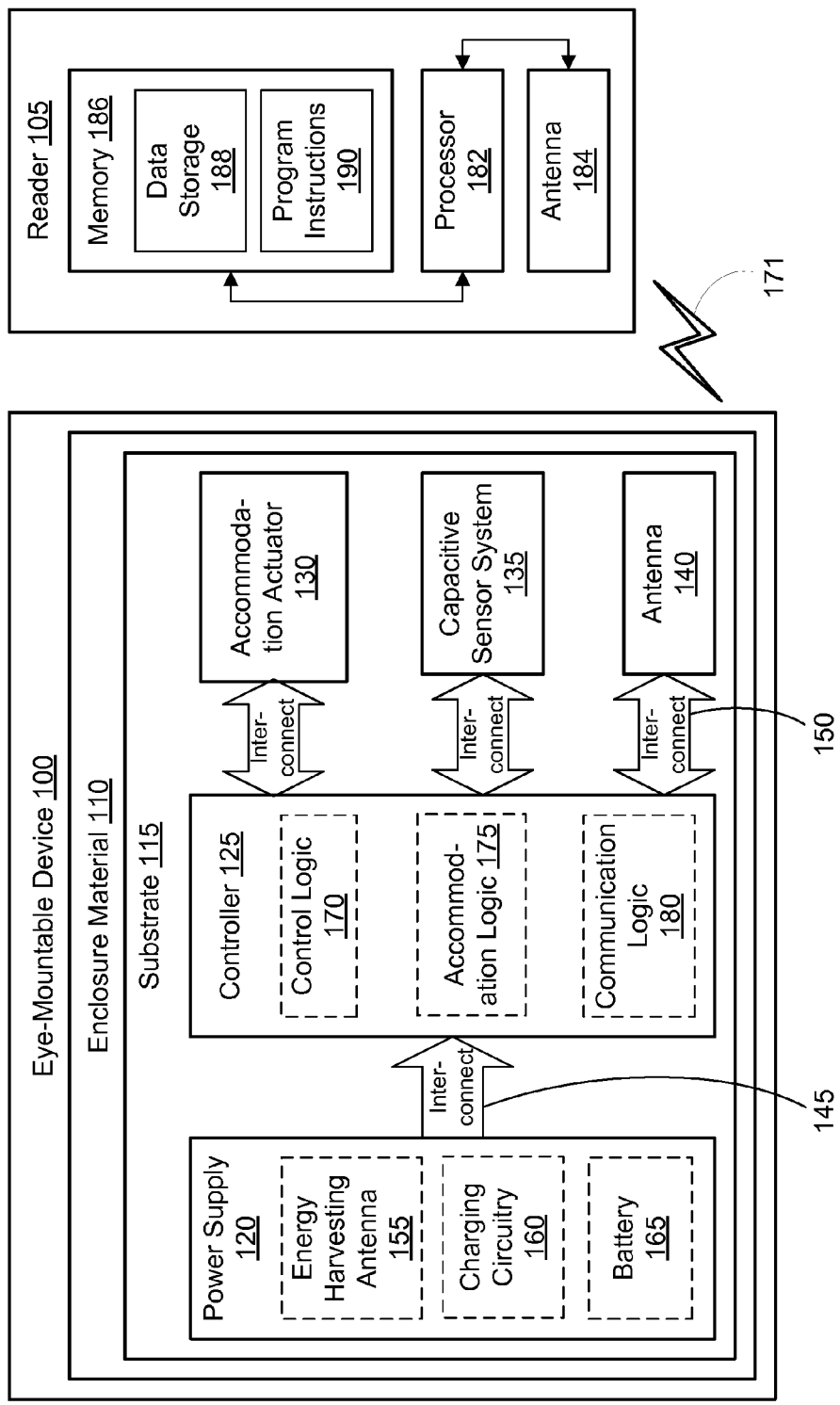
FIG. 1 is a functional block diagram of a system to exchange secure communications in accordance with an embodiment of the disclosure.

Embodiments of an apparatus, system and methods for encrypted communication with an accommodation-capable eye-mountable device (or "EMD") are described herein. In the following description numerous specific details are set forth to provide a thorough understanding of the embodiments. One skilled in the relevant art will recognize, however, that the techniques described herein may be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein is a smart contact lens or other eye-mountable device that includes logic to support encrypted communications. Embodiments of the eye-mountable device may include power supply circuitry and control electronics embedded within an enclosure material formed to be contact mounted in an eye. The EMD may include one or more sensors to detect one or more conditions of the EMD and/or of a user of the EMD. For example, the EMD may include an accommodation actuator, where multiple operational modes of the EMD each correspond to a different respective level of accommodation (e.g., including different respective index of refraction and/or a different respective focal length) of the accommodation actuator. One or more capacitive, photodetector or other sensors of the EMD may detect for a condition indicating that the EMD is to transition to (or from) one of the multiple operational modes. Alternatively or in addition, the EMD may include one or more electrochemical sensors to detect for an analyte (such as glucose) that may be present, for example, in a tear film formed by the user over the EMD. Circuitry of the EMD may generate, communicate and/or otherwise determine data specifying or otherwise indicating the one or more conditions. Alternatively or in addition, such data may be determined for configuring sensing and/or other operation of the EMD. In some embodiments, the control logic includes or otherwise couples to communication logic to aid in communication of an encrypted version of such data.

Features of various embodiments are described herein in the context of an eye-mountable accommodating lens device, wherein an optical strength (e.g., corresponding to a particular focal length) of the device may be changed based on capacitive gaze tracking mechanisms. However, such description may be extended to additionally or alternatively apply to any of a variety of other optical devices that may operate while disposed in direct contact with (e.g., in or on) an eye of a user. For example, certain embodiments are not limited with respect to a particular mechanism (e.g., liquid crystal element or other) by which an accommodation actuator changes an optical strength of the device. Furthermore, some embodiments are not limited with respect to a capacitive gaze tracking, photodetector gaze tracking of other technique that may be used to determine whether a change in optical strength is to take place. In some embodiments, cryptographic communications are exchanged by an EMD that performs analyte sensing—e.g., in addition to, or instead of, automatic accommodation.

The enclosure material of an EMD may be fabricated of a variety of materials compatible for direct contact with a human eye, such as a polymeric material, a hydrogel, PMMA, silicone based polymers (e.g., fluoro-silicon acrylate), or otherwise. The enclosure material may be in the form of a round lens with a concave curvature configured to mount to a corneal surface of an eye. The electronics may be disposed upon a substrate embedded within the enclosure material near its periphery to avoid interference with incident light received closer to the central region of the cornea. In some embodiments, gaze direction or other focal distance information from a capacitive sensor, photodetector system or other sensor mechanism of the eye-mountable device may be used to determine the amount of accommodation to be applied via a see-through accommodation actuator positioned in a central portion of the enclosure material. The accommodation actuator may be coupled to the controller to be electrically manipulated thereby. For example, the accommodation actuator may be implemented with a liquid crystal cell that changes its index of refraction in response to an applied electrical bias signal. In other embodiments, the accommodation actuator may be implemented using other types of electro-active optical materials such as electro-optic materials that vary refractive index in the presence of an applied electric field or electro-mechanical structures that change the shape of a deformable lens. Other example structures that may be used to implement the accommodation actuator include electro-wetting optics, micro-electromechanical systems, or otherwise.

FIG. 1 is a functional block diagram of a system including an eye-mountable device 100 with cryptographic mechanisms for protecting communication with an external reader 105, in accordance with an embodiment of the disclosure. The exposed portion of eye-mountable device 100 is an enclosure material 110 formed to be contact-mounted to a corneal surface of an eye. A substrate 115 may be embedded within or surrounded by enclosure material 110 to provide a mounting surface for a power supply 120, a controller 125, an accommodation actuator 130, a capacitive sensor system 135, an antenna 140, and various interconnects 145 and 150. The illustrated embodiment of power supply 120 includes an energy harvesting antenna 155, charging circuitry 160, and a battery 165. The illustrated embodiment of controller 125 includes control logic 170, accommodation logic 175, and communication logic 180. The illustrated embodiment of reader 105 includes a processor 182, an antenna 184, and memory 186. The illustrated embodiment of memory 186 includes data storage 188 and program instructions 190.

Controller 125 may be coupled to receive feedback control signals from capacitive sensor system 135 and further coupled to operate accommodation actuator 130. Power supply 120 supplies operating voltages to the controller 125 and/or the accommodation actuator 130. Antenna 140 may be operated by the controller 125 to communicate information to and/or from eye-mountable device 100. In one embodiment, antenna 140, controller 125, power supply 120, and capacitive sensor system 135 are all situated on the embedded substrate 115. In one embodiment, accommodation actuator 130 may be embedded within enclosure material 110, but is not disposed on substrate 115. Because eye-mountable device 100 includes electronics and is configured to be contact-mounted to an eye, it is also referred to herein as an ophthalmic electronics platform, contact lens, or smart contact lens.

To facilitate contact-mounting, the enclosure material 110 may have a concave surface configured to adhere ("mount") to a moistened corneal surface (e.g., by capillary forces with a tear film coating the corneal surface). Additionally or alternatively, the eye-mountable device 100 may be adhered by a vacuum force between the corneal surface and enclosure material 110 due to the concave curvature. While mounted with the concave surface against the eye, the outward-facing surface of the enclosure material 110 may have a convex curvature that is formed to not interfere with eye-lid motion while the eye-mountable device 100 is mounted to the eye. For example, the enclosure material 110 may be a substantially transparent curved disk shaped similarly to a contact lens.

Enclosure material 110 may include one or more biocompatible materials, such as those employed for use in contact lenses or other ophthalmic applications involving direct contact with the corneal surface. Enclosure material 110 may optionally be formed in part from such biocompatible materials or may include an outer coating with such biocompatible materials. Enclosure material 110 may include materials configured to moisturize the corneal surface, such as hydrogels and the like. In some instances, enclosure material 110 may be a deformable ("non-rigid") material to enhance wearer comfort. In some instances, enclosure material 110 may be shaped to provide a predetermined, vision-correcting optical power, such as can be provided by a contact lens. Enclosure material may be fabricated of various materials including a polymeric material, a hydrogel, PMMA, silicone based polymers (e.g., fluoro-silicon acrylate), or otherwise.

Substrate 115 includes one or more surfaces suitable for mounting the capacitive sensor system 135, controller 125, power supply 120, and antenna 140. Substrate 115 may be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide) may be patterned on substrate 115 to form circuitry, electrodes, etc. For example, antenna 140 may be formed by depositing a pattern of gold or another conductive material on substrate 115. Similarly, interconnects 145 and 150 may be formed by depositing suitable patterns of conductive materials on substrate 115. A combination of resists, masks, and deposition techniques may be employed to pattern materials on substrate 115. Substrate 115 may be a relatively rigid material, such as polyethylene terephthalate ("PET") or another material sufficient to structurally support the circuitry and/or electronics within enclosure material 110. Eye-mountable device 100 may alternatively be arranged with a group of unconnected substrates rather than a single substrate. For example, controller 125 and power supply 120 may be mounted to one substrate, while antenna 140 and capacitive sensor system 135 are mounted to another substrate and the two may be electrically connected via interconnects.

In some embodiments, power supply 120 and controller 125 (and the substrate 115) may be positioned away from the center of eye-mountable device 100 and thereby avoid interference with light transmission to the eye through the center of eye-mountable device 110. In contrast, accommodation actuator 130 may be centrally positioned to apply optical accommodation to the light transmitted to the eye through the center of eye-mountable device 110. For example, where eye-mountable device 100 is shaped as a concave-curved disk, substrate 115 may be embedded around the periphery (e.g., near the outer circumference) of the disk. In some embodiments, capacitive sensor system 135 includes one or more discrete capacitance sensors that are peripherally distributed to sense the eyelid overlap. In some embodiments, one or more capacitance sensors may also be positioned in the center region of eye-mountable device 100. Capacitive sensor system 135 and/or substrate 115 may be substantially transparent to incoming visible light to mitigate interference with light transmission to the eye.

Substrate 115 may be shaped as a flattened ring with a radial width dimension sufficient to provide a mounting platform for the embedded electronics components. Substrate 115 may have a thickness sufficiently small to allow the substrate to be embedded in enclosure material 110 without adversely influencing the profile of eye-mountable device 100. Substrate 115 may have a thickness sufficiently large to provide structural stability suitable for supporting the electronics mounted thereon. For example, substrate 115 may be shaped as a ring with a diameter of about 10 millimeters, a radial width of about 1 millimeter (e.g., an outer radius 1 millimeter larger than an inner radius), and a thickness of about 50 micrometers. Substrate 115 may optionally be aligned with the curvature of the eye-mounting surface of eye-mountable device 100 (e.g., convex surface). For example, substrate 115 may be shaped along the surface of an imaginary cone between two circular segments that define an inner radius and an outer radius. In such an example, the surface of substrate 115 along the surface of the imaginary cone defines an inclined surface that is approximately aligned with the curvature of the eye mounting surface at that radius.

In the illustrated embodiment, power supply 120 includes a battery 165 to power the various embedded electronics, including controller 125. Battery 165 may be inductively charged by charging circuitry 160 and energy harvesting antenna 155. In one embodiment, antenna 140 and energy harvesting antenna 155 are independent antennae, which serve their respective functions of energy harvesting and communications. In another embodiment, energy harvesting antenna 155 and antenna 140 are the same physical antenna that are time shared for their respective functions of inductive charging and wireless communications with reader 105.

Additionally or alternatively, power supply 120 may include a solar cell ("photovoltaic cell") to capture energy from incoming ultraviolet, visible, and/or infrared radiation. Furthermore, an inertial power scavenging system may be included to capture energy from ambient vibrations.

Charging circuitry 160 may include a rectifier/regulator to condition the captured energy for charging battery 165 or directly power controller 125 without battery 165. Charging circuitry 160 may also include one or more energy storage devices to mitigate high frequency variations in energy harvesting antenna 155. For example, one or more energy storage devices (e.g., a capacitor, an inductor, etc.) may be connected to function as a low-pass filter. In an embodiment, charging circuitry includes or couples to a direct current to direct current (DC-DC) converter that, for example, is unidirectional or bidirectional.

Controller 125 contains logic to choreograph the operation of the other embedded components. Control logic 170 controls the general operation of eye-mountable device 100, including providing a logical user interface, power control functionality, etc. Accommodation logic 175 includes logic for monitoring feedback signals from capacitive sensor system 135, determining the current gaze direction or focal distance of the user, and manipulating accommodation actuator 130 in response to provide the appropriate accommodation. The auto-accommodation may be implemented in real-time based upon feedback from the capacitive gaze tracking, or permit user control to select specific accommodation regimes (e.g., near-field accommodation for reading, far-field accommodation for regular activities, etc.). Communication logic 180 provides a communication protocol for wireless communication via antenna 140 with a remote device (also referred to herein as an "auxiliary device"), as represented by the illustrative reader 105. In one embodiment, communication logic 180 provides backscatter communication via antenna 140 when in the presence of an electromagnetic field 171 output from reader 105. In one embodiment, communication logic 180 operates as a smart wireless radio-frequency identification ("RFID") tag that modulates the impedance of antenna 140 for backscatter wireless communications. Communication logic 180 may include or couple to cryptographic logic (not shown) that is to provide encryption and/or decryption to improve security of wireless communication via antenna 140. The various logic modules of controller 125 may be implemented in software/firmware executed on a general purpose microprocessor, in hardware (e.g., application specific integrated circuit), or a combination of both.

Eye-mountable device 100 may include various other embedded electronics and logic modules. For example, a light source or pixel array may be included to provide visible feedback to the user. An accelerometer or gyroscope may be included to provide positional, rotational, directional or acceleration feedback information to controller 125.

It is noted that the block diagram shown in FIG. 1 is described in connection with functional modules for convenience in description, but does not necessarily connote physical organization. Rather, embodiments of eye-mountable device 100 (and/or embodiments of an auxiliary device) may be arranged with one or more of the functional modules ("sub-systems") implemented in a single chip, multiple chips, in one or more integrated circuits, or otherwise.

External reader 105 includes an antenna 184 (or group of more than one antennae) to send and receive wireless signals 171 to and from eye-mountable device 100. External reader 105 also includes a computing system with a processor 182 in communication with a memory 186. Memory 186 may be a non-transitory computer-readable medium that may include, without limitation, magnetic disks, optical disks, organic memory, and/or any other volatile (e.g. RAM) or non-volatile (e.g. ROM) storage system readable by the processor 182. Memory 186 may include a data storage 188 to store indications of data, such as data logs (e.g., user logs), program settings (e.g., to adjust behavior of eye-mountable device 100 and/or external reader 105), etc. Memory 186 may also include program instructions 190 for execution by processor 182 to cause the external reader 105 to perform processes specified by the instructions 190. For example, program instructions 190 may cause external reader 105 to provide a user interface that allows for retrieving information communicated from eye-mountable device 100 or allows transmitting information to eye-mountable device 100 to program or otherwise select operational modes of eye-mountable device 100. External reader 105 may also include one or more hardware components for operating antenna 184 to send and receive wireless signals 171 to and from eye-mountable device 100. Executing software and/or circuit hardware of reader 105 may provide cryptographic functionality to support encrypted communication of at least some information between EMD 100 and reader 105.

External reader 105 may be a smart phone, digital assistant, or other portable computing device with wireless connectivity sufficient to provide the wireless communication link 171. External reader 105 may also be implemented as an antenna module that may be plugged in to a portable computing device, such as in an example where the communication link 171 operates at carrier frequencies not commonly employed in portable computing devices. In some instances, external reader 105 is a special-purpose device configured to be worn relatively near a wearer's eye to allow the wireless communication link 171 to operate with a low power budget. For example, the external reader 105 may be integrated in a piece of jewelry such as a necklace, earing, etc. or integrated in an article of clothing worn near the head, such as a hat, headband, etc.

Figure 2A:
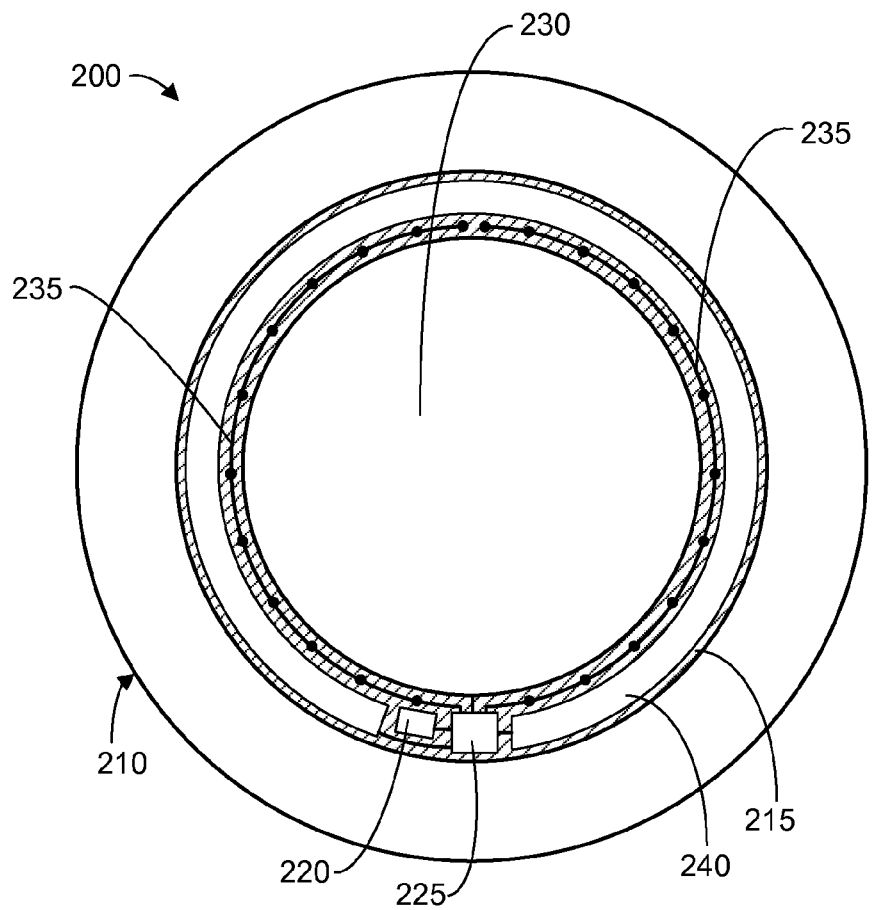
FIG. 2A is a top view of an eye-mountable device, in accordance with an embodiment of the disclosure.
Figure 2B:
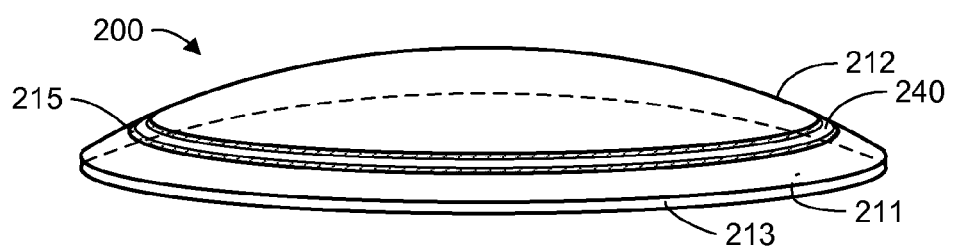
FIG. 2B is a perspective view of an eye-mountable device, in accordance with an embodiment of the disclosure.

FIGS. 2A and 2B illustrate two views of an eye-mountable device 200, in accordance with an embodiment of the disclosure. FIG. 2A is a top view of eye-mountable device 200 while FIG. 2B is a perspective view of the same. Eye-mountable device 200 is one possible implementation of eye-mountable device 100 illustrated in FIG. 1. The illustrated embodiment of eye-mountable device 200 includes an enclosure material 210, a substrate 215, a power supply 220, a controller 225, an accommodation actuator 230, a capacitive sensor system 235, and an antenna 240. It should be appreciated that FIGS. 2A and 2B are not necessarily drawn to scale, but have been illustrated for purposes of explanation only in describing the arrangement of the example eye-mountable device 200.

Enclosure material 210 of eye-mountable device 200 may be shaped as a curved disk. Enclosure material 210 is a substantially transparent material to allow incident light to be transmitted to the eye while eye-mountable device 200 is mounted to the eye. Enclosure material 210 may be a biocompatible material similar to those employed to form vision correction and/or cosmetic contact lenses in optometry, such as a polymeric material, polyethylene terephthalate ("PET"), polymethyl methacrylate ("PMMA"), polyhydroxyethylmethacrylate ("polyHEMA"), a hydrogel, silicon based polymers (e.g., fluoro-silicon acrylate) combinations of these, or otherwise. Enclosure material 210 may be formed with one side having a concave surface 211 suitable to fit over a corneal surface of an eye. The opposite side of the disk may have a convex surface 212 that does not interfere with eyelid motion while eye-mountable device 200 is mounted to the eye. In the illustrated embodiment, a circular or oval outer side edge 213 connects the concave surface 211 and convex surface 212.

Eye-mountable device 200 may have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of eye-mountable device 200 may be selected according to the size and/or shape of the corneal surface of the wearer's eye. Enclosure material 210 may be formed with a curved shape in a variety of ways. For example, techniques similar to those employed to form vision-correction contact lenses, such as heat molding, injection molding, spin casting, etc. may be employed to form enclosure material 210.

Substrate 215 may be embedded within enclosure material 210. Substrate 215 may be embedded to be situated along the outer periphery of enclosure material 210, away from the central region where accommodation actuator 230 is positioned. In the illustrated embodiment, substrate 215 encircles accommodation actuator 230. Substrate 215 may not interfere with vision because it is too close to the eye to be in focus and is positioned away from the central region where incident light is transmitted to the light-sensing portions of the eye. In some embodiments, substrate 215 may optionally be formed of a transparent material to further mitigate effects on visual perception. Substrate 215 may be shaped as a flat, circular ring (e.g., a disk with a centered hole). The flat surface of substrate 215 (e.g., along the radial width) may be a platform for mounting electronics and for patterning conductive materials to form electrodes, antenna (e), and/or interconnections.

Capacitive sensor system 235 may be distributed about eye-mountable device 200 to sense eyelid overlap in a manner similar to capacitive touch screens. By monitoring the amount and position of eyelid overlap, feedback signals from capacitive sensor system 235 may be measured by controller 225 to determine the approximate gaze direction and/or focal distance. Capacitive sensor system 235 may be disposed within enclosure material 210 on substrate 215. In the illustrated embodiment, capacitive sensor system 235 is distributed peripherally around accommodation actuator 230 along the inner edge of substrate 215 between antenna 240 and accommodation actuator 230. In other embodiments, capacitive sensor system 235 may be alternatively distributed in or on eye-mountable device 200. In the illustrated embodiment, capacitive sensor system 235 includes a plurality of discrete capacitance sensors coupled to a common read-line; however, various implementations include a single elongated capacitance sensor, a plurality of discrete capacitance sensors, multiple discrete capacitance sensors coupled in parallel via a common read-line, multiple independent branches of parallel coupled discrete capacitance sensors, etc.

Accommodation actuator 230 may be centrally positioned within enclosure material 210 to affect the optical power of eye-mountable device 200 in the user's center of vision. In various embodiments, accommodation actuator 230 operates by changing its index of refraction under the influence of controller 225. By changing its refractive index, the net optical power of the curved surfaces of eye-mountable device 200 may be altered, thereby applying controllable accommodation. Accommodation actuator 230 may be implemented using a variety of different electro-active optical devices. For example, accommodation actuator 230 may be implemented using a layer of liquid crystal (e.g., a liquid crystal cell) disposed in the center of enclosure material 210. In other embodiments, accommodation actuator 230 may be implemented using other types of electro-active optical materials such as electro-optic materials that vary refractive index in the presence of an applied electric field. Accommodation actuator 230 may be a distinct device embedded within enclosure material 210 (e.g., liquid crystal cell), or a bulk material having a controllable refractive index. In yet another embodiment, accommodation actuator 230 may be implemented using a deformable lens structure that changes shape under the influence of an electrical signal. Accordingly, the optical power of eye-mountable device 200 may be controlled by controller 225 with the application of electric signals via one or more electrodes extending from controller 225 to accommodation actuator 230.

Accommodation actuator 230 may be implemented using a variety of different liquid crystal structures including nematic liquid crystal, nematic twisted liquid crystal, cholesteric liquid crystal, or blue phase liquid crystal. Since a low switching voltage is desirable for low power chip design, nematic liquid crystals with switching voltages less than 5V are suitable. With the application of a 5V control signal, refractive index switching ranging from approximately 1.74 in an off-mode to 1.52 in an on-mode is achievable. A refractive index shift of 0.2 should be sufficient to provide near-field accommodation for reading.

Returning to FIG. 2A, loop antenna 240 is a layer of conductive material patterned along the flat surface of the substrate to form a flat conductive ring. In some examples, to allow additional flexibility along the curvature of the enclosure material, loop antenna 240 may include multiple substantially concentric sections electrically joined together. Each section may then flex independently along the concave/convex curvature of eye-mountable device 200. In some examples, loop antenna 240 may be formed without making a complete loop. For instances, antenna 240 may have a cutout to allow room for controller 225 and power supply 220, as illustrated in FIG. 2A. However, loop antenna 240 may also be arranged as a continuous strip of conductive material that wraps entirely around the flat surface of substrate 215 one or more times. For example, a strip of conductive material with multiple windings may be patterned on the backside of substrate 215 opposite controller 225, power supply 220, and capacitive sensor system 235. Interconnects between the ends of such a wound antenna (e.g., the antenna leads) may then be passed through substrate 215 to controller 225.

In some embodiment, an EMD additionally or alternatively operates to monitor an analyte, such as glucose, in a fluid disposed on an eye of a user, as variously illustrated in FIGS. 3A-3C. For example, tearing by the user may result in a tear film layer 42 forming over a polymeric material (or other encapsulation layer material 350) of the EMD. One or more electrochemical sensors embedded in or on the EMD may operate to detect an analyte from the outer tear film layer 42 that coats the encapsulation layer. By way of illustration and not limitation, the electrochemical sensor may include a working electrode 320 and a reference electrode 322 each mounted near an outward-facing side 354 on a substrate 360 disposed in or under an encapsulation layer 350 of the EMD—e.g., such that the electrodes 320, 322 are entirely covered by an overlapping portion 312 of the encapsulation layer material 350. The electrodes 320, 322 in the electrochemical sensor may thus be separated from the outer tear film layer 42 by the thickness of the overlapping portion 312. For example, the thickness of the overlapping region may be approximately 10 micrometers.

An analyte in the tear film 42 may diffuse (as represented by arrow 310) through the overlapping portion 312 to the working electrode 320. A current measured through the working electrode 320 may be based on the electrochemical reaction rate at the working electrode 320, which in turn is based on the amount of analyte diffusing to the working electrode 320. In a steady state approximation, the analyte may be resupplied to the outer tear film layer 42 by surrounding regions of the tear film 42 at the same rate that the analyte is consumed at the working electrode 320. Because the rate at which the analyte is resupplied to the probed region of the outer tear film layer 42 is approximately proportionate to the tear film concentration of the analyte, the current (i.e., the electrochemical reaction rate) is an indication of the concentration of the analyte in the outer tear film layer 42.

Based on signals generated by the one or more electrochemical sensors, circuit logic (not shown) disposed in or on, or otherwise coupled to, the substrate 360 may store data specifying or otherwise indicating one or more characteristics (e.g., including a concentration) of a detected analyte in the tear film layer 42. Alternatively or in addition, such circuit logic may store data for control logic to configure operation of the one or more electrochemical sensors. Some or all such data may be variously exchanged between the EMD and an auxiliary device via cryptographic mechanisms and/or techniques as described herein.

As shown in FIG. 3B, one or more electrochemical sensors of an EMD may, in another embodiment, detect an analyte from a tear film 42 that directly contacts the one or more electrochemical sensors via a channel 330 in the encapsulation layer material 350. The channel may be defined at least in part, for example, by side walls 332 formed by pressure molding or casting the encapsulation layer material 350, or by plasma etching or other processing to remove a portion of encapsulation layer material 350 following encapsulation. In one illustrative embodiment, the channel 330 is approximately 10 micrometers in height. The channel fluidly connects the outer tear film layer 42 to the sensor electrodes 320, 322. Thus, the working electrode 320 may be directly exposed to the outer tear film layer 42. As a result, analyte transmission to the working electrode 320 may be unaffected by the permeability of the encapsulation layer material 350 to the analyte of interest. In still another embodiment, shown in FIG. 3C, one or more electrochemical sensors detect an analyte from the tear film 42 that diffuses (as represented by arrow 344) from an indentation 340 through a thinned region 342 of the encapsulation layer material 350.

Figure 4:
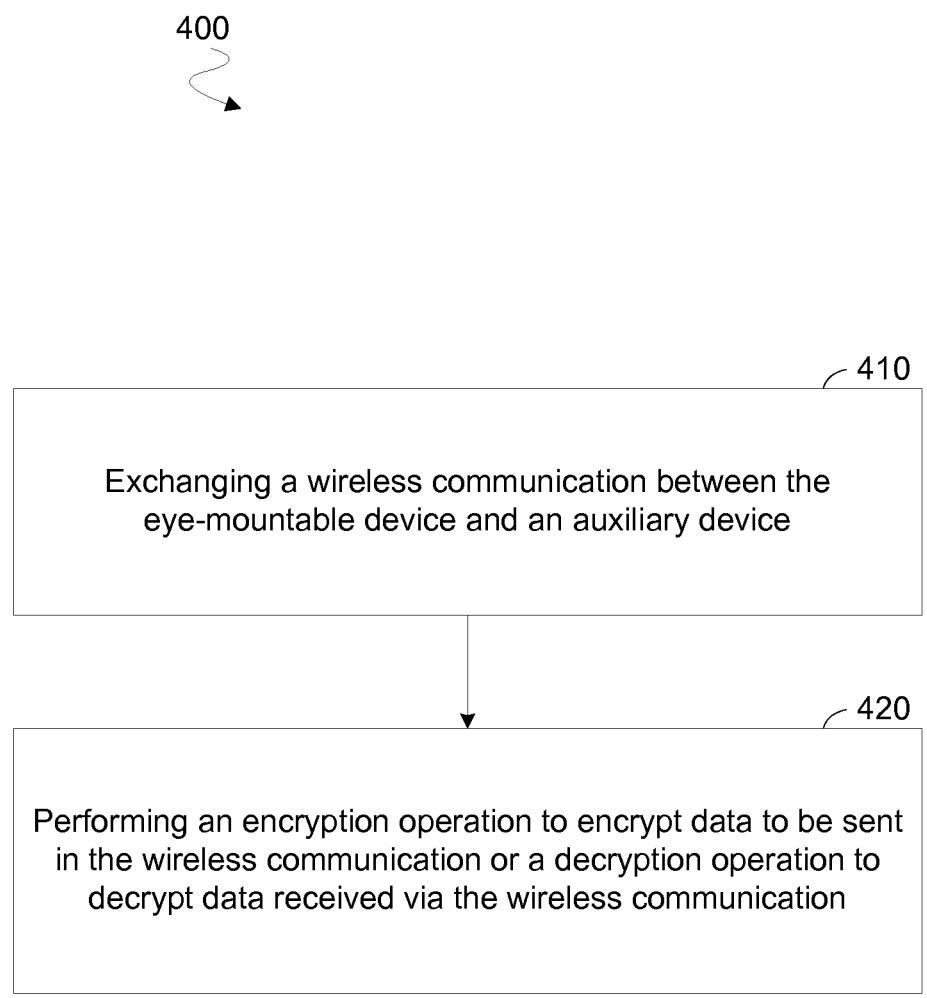
FIG. 4 is a flow diagram illustrating elements of a method for exchanging an encrypted communication with an eye-mountable device according to an embodiment.

FIG. 4 illustrates elements of a method for exchanging encrypted communications with an EMD according to an embodiment. Method 400 may be performed by an EMD or by an auxiliary device that is to communicate with such an EMD. For example, method 400 may be performed by EMD 100, EMD 200 and/or reader 105.

In an embodiment, method 400 further comprises, at 410, exchanging a wireless communication between the EMD and an auxiliary device. The exchanging at 410 may include, for example, an EMD transmitting data to an auxiliary device and/or receiving the data from said auxiliary device. Alternatively or in addition, the exchanging at 410 may include an auxiliary device transmitting data to an EMD and/or receiving the data from said EMD. Such data may include configuration data, log data and/or the like.

The wireless communications exchanged at 410 may include a radio-frequency identification (RFID) communication that, for example, is compatible in one or more respects with an Electronic Product Code (EPC) protocol specification or other such RFID standard. The Electronic Product Code (EPC) Class-1 Generation-2 UHF RFID Protocol—e.g., for communication in a frequency band between 860 MHz and 980 MHz (between 902 MHz and 928 MHz, in one embodiment)—is just one example of such a standard. However, the communications at 410 may include operations adapted from near field communication (NFC), Bluetooth and/or any of various other communication techniques.

Method 400 may further comprise, at 420, performing an encryption operation to encrypt data to be sent in the wireless communication or a decryption operation to decrypt data received via the wireless communication. A cryptographic operation performed at 420 may include, for example, calculations that are compatible with an Advanced Encryption Standard (AES) such as that issued by the U.S. National Institute of Standards and Technology (NIST) in 2001. By way of illustration and not limitation, the calculations may include performing 128-bit AES (or other) encryption of a vector, the encryption based on a cryptographic key, to generate cipher information. The cipher information may be used in XOR calculations, or other processing, with plaintext data to generate an encrypted version of such data. Alternatively or in addition, such cipher information may be used in XOR calculations, or other processing, with encrypted data to generate a decrypted version of such data.

Method 400 may comprise further operations (not shown) that, for example, are based on data exchanged at 410 and/or generate data to be exchanged at 410. By way of illustration and not limitation, such further operations may include configuring one of multiple operational modes of an eye-mountable device including an accommodation actuator that is operable to change an optical strength of the eye-mountable device. For example, the multiple operational modes may each correspond to a different respective level of accommodation (e.g., including different respective index of refraction and/or a different respective focal length) of the accommodation actuator. In an embodiment, the configuring at includes the EMD selecting from among a plurality of modes previously defined at the EMD. Alternatively or in addition, the configuring at may include an auxiliary device transmitting wireless communications to program the EMD with definitions of the multiple operational modes. Such further operations may additionally or alternatively include, for example, detecting an analyte with an electrochemical sensor of the EMD and storing in a memory of the EMD data specifying or otherwise indicating one or more characteristics of the detected analyte.

Figure 5:
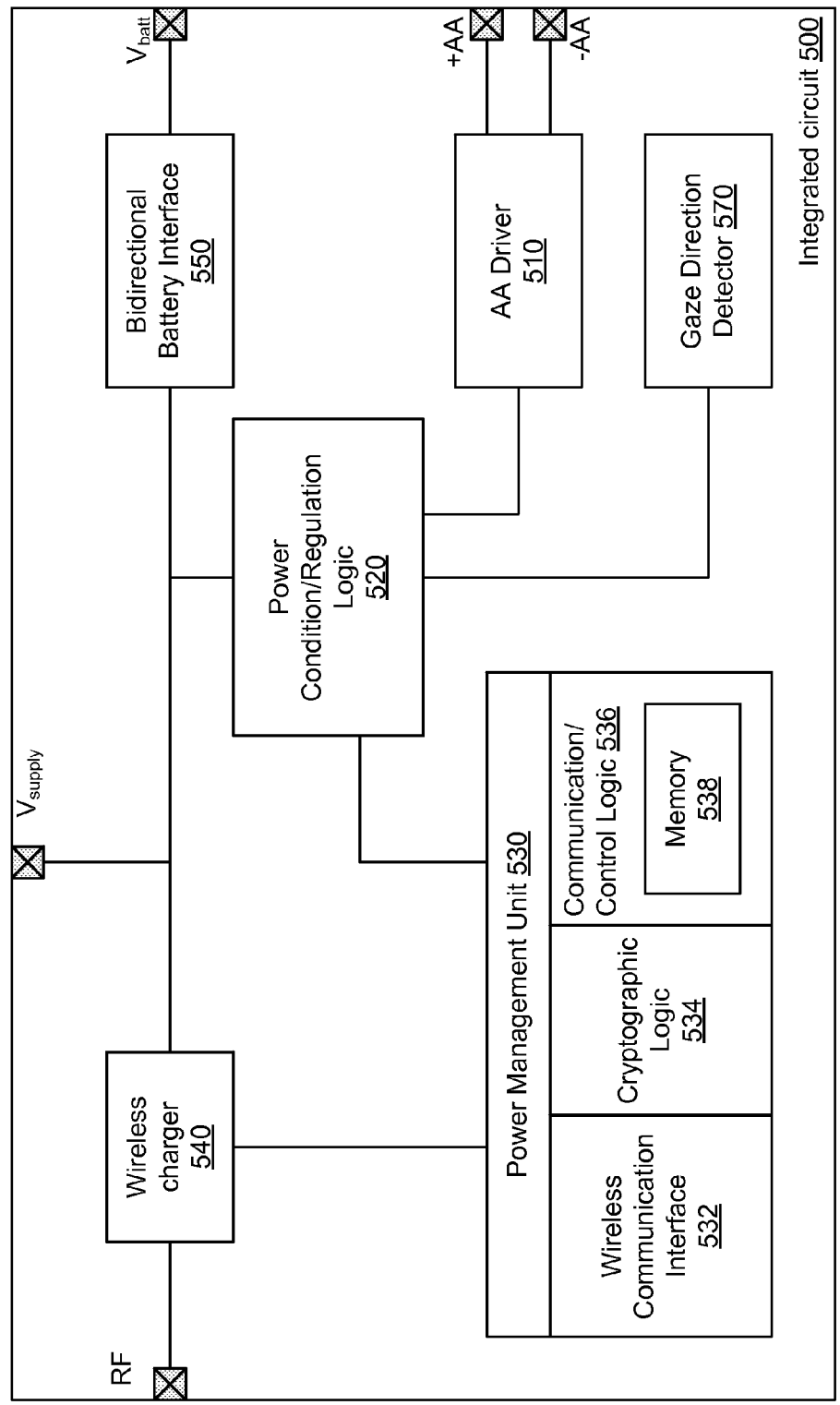
FIG. 5 is a functional block diagram illustrating elements of circuitry to exchange an encrypted communication according to an embodiment.

FIG. 5 illustrates elements of a controller integrated circuit (IC) 500 to support encrypted communication exchanges with an eye-mountable device according to an embodiment. Controller IC 500 may include some or all features of one of controllers 125, 225, for example. In an embodiment, controller IC 500 includes circuitry to perform some or all operations of method 400.

Controller IC 500 includes an accommodation actuator (AA) driver 510 to couple to the accommodation actuator (not shown) via contacts +AA, −AA. AA driver 510 may operate under the control of power condition/regulation logic 520 of controller IC 500, which in turn may be responsive to one or more detected condition of the eye-mountable device, of a user thereof and/or of an environment thereof. One example of logic that might provide for detection of such one or more conditions is represented by gaze direction detector 570 of controller IC 500. Operation of power condition/regulation logic 520 to regulate AA driver 510 may be additionally or alternatively based on signal exchanges with a power management unit (PMU) 530 of controller IC 500.

Under control by power condition/regulation logic 520, AA driver 510 may provide a voltage differential across the accommodation actuator. In an illustrative scenario according to one embodiment, gaze direction detector 570 may provide to power condition/regulation logic 520 an indication that a user is gazing in a particular direction. In response, power condition/regulation logic 520 may identify and configure an operational mode corresponding to the indicated direction of gaze. For example, power condition/regulation logic 520 may signal communication/control logic 524 of PMU 530 to determine whether the direction of gaze corresponds to a configuration to implement a relatively high optical strength, or another configuration to implement a relatively low optical strength.

Communication/control logic 534 may include or otherwise provide access to one or more media to store configuration information identifying different operational modes of the eye-mountable device—e.g., where some or all such operational modes each corresponds to a different respective optical strength. Alternatively or in addition, such configuration information may describe one or more device power management modes, communication modes, management modes and/or the like. Communication/control logic 534 may have access to such information based on communications by controller IC 500 with a reader or other remote agent (not shown). For example, PMU 530 may include or couple to a RFID radio 532 that communicates with one or more antennae (not shown) via an antenna contact RF. RFID radio 532 represents one example of communication functionality, such as that of communication logic 180, to receive configuration information for use in determining operation of power condition/regulation logic 520, AA driver 510 and/or the like.

Based on exchanges with gaze direction detector 570 (or other such detection logic) and/or with PMU 530, power condition/regulation logic 520 may provide one or more voltages and/or one or more control signals to regulate how AA driver 510 is to maintain or transition between different voltage levels at different times. Although certain embodiments are not limited in this regard, bidirectional battery interface 550 may provide for battery recharging from one or more other power sources. One example of such power sources is an energy harvesting antenna (not shown)—e.g., coupled via contact RF. A wireless charger 540 may provide for powering of PMU 530 and/or other circuitry of controller IC 500 based on power from an energy harvesting antenna. Other examples of such alternative power sources include a solar cell or inertial power scavenging system (not shown)— e.g., coupled via a contact $V_{supply}$.

Communication/control logic 536 may include or otherwise have access to a memory 538 (e.g., comprising volatile memory) to store configuration information, log data describing operation of the EMD and/or the like. Wireless communications between an EMD and an auxiliary device may be performed to read data from and/or write data to memory 538. Some embodiments variously protect the communication of such data with encryption and/or decryption functionality of cryptographic logic 534 that is included in or coupled to communication/control logic 536.

Figure 6:
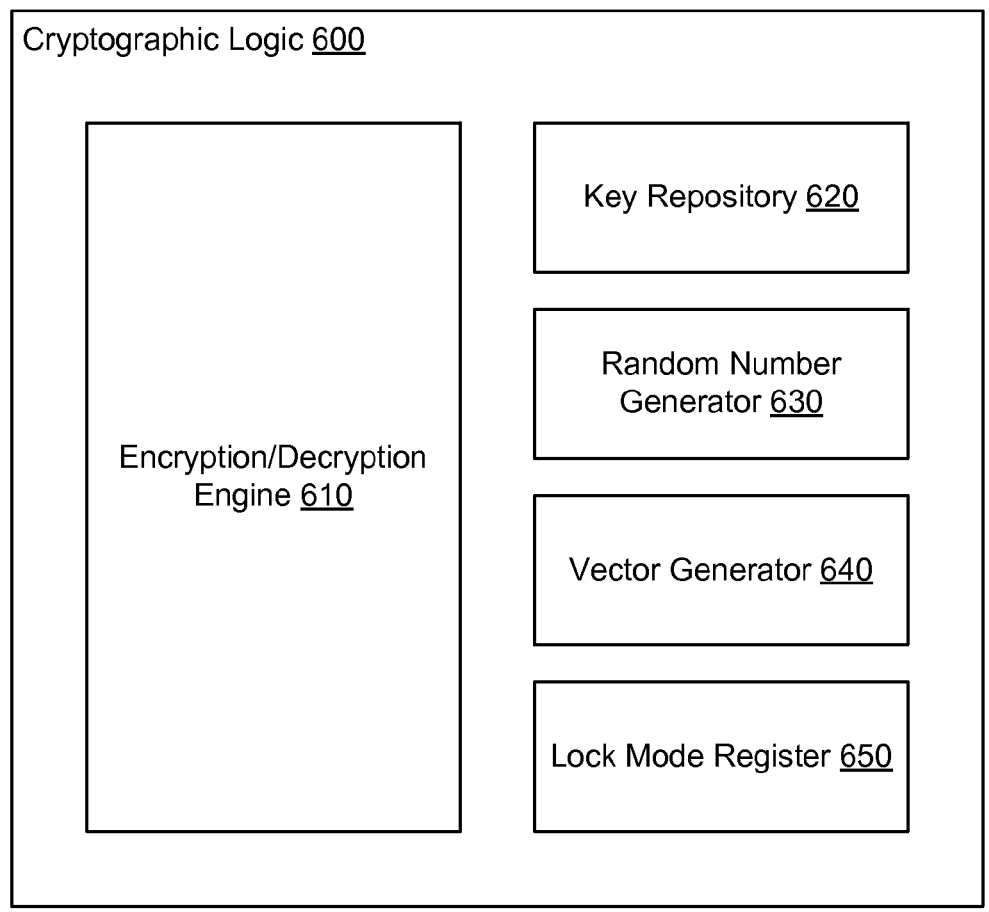
FIG. 6 is a functional block diagram illustrating elements of cryptographic logic according to an embodiment.

FIG. 6 illustrates elements of cryptographic logic 600 to support secure communications with an EMD according to an embodiment. Cryptographic logic 600 may perform one or more operations of method 400, for example, and/or may exchange information with a device performing method 400. Cryptographic logic 600 may include some or all of the features of cryptographic logic 534 or, alternatively, provide cryptographic functionality of reader 105 or other such auxiliary device.

Such cryptographic functionality may include encryption/decryption mechanisms that are efficient with respect to power, speed and/or integrated circuit area. For example, cryptographic logic 600 may support participation in a symmetric private key cryptographic scheme. Generally speaking, public key cryptography schemes require a comparatively large tradeoff in terms of circuitry speed, power and/or area. Accordingly, symmetric private key cryptography with cryptographic logic 600 may aid in communication security in the extremely resource-constrained use case of an EMD.

In an embodiment, cryptographic logic 600 includes an encryption/decryption engine 610 comprising hardware, firmware and/or executing software to encrypt at least some data to be transmitted from (or alternatively, transmitted to) an EMD and/or to decrypt at least some data received by (or alternatively, received from) such an EMD. Such communications may be variously exchanged with a wireless interface having, for example, some or all of the features of wireless communication interface 532. Operations by encryption/decryption engine 610 may be suited for resource constraints imposed by an EMD. By way of illustration and not limitation, such operations may be compatible in one or more respects with an Advanced Encryption Standard (AES) such as that issued by the U.S. National Institute of Standards and Technology (NIST) in 2001. For example, 128-bit AES encryption and/or decryption may be performed by encryption/decryption engine 610. Another example of a cryptographic scheme provided by encryption/decryption engine 610 is the PRESENT cipher standard ISO/IEC 29192-2:2012 issued in 2012 by the International Organization for Standardization and the International Electrotechnical Commission (ISO/IEC). However, any of various other types of cryptographic calculation standards may be supported by encryption/decryption engine 610, according to different embodiments.

In an embodiment, encryption/decryption engine 610 includes or otherwise has access to a key repository 620 (e.g., including one or more registers of volatile memory) to store a key value or other information indicating such a key value. Encryption/decryption engine 610 may determine such a key value for use as a symmetric public key in encrypting at least some data to be transmitted by a device including cryptographic logic 600 and/or in decrypting at least some data that has been received by such a device.

Cryptographic logic 600 may further comprise logic to determine a vector to be used—e.g., in addition to the key value—to perform such encryption and/or decryption. By way of illustration and not limitation, cryptographic engine 600 may further include or otherwise have access to a random number generator 630 to generate a number—e.g., where operations of random number generator 630 are adapted from conventional pseudo-random and/or random number generation techniques (which are not detailed herein to avoid obscuring certain features of various embodiments). Due to resource constraints and/or to supporting security mechanisms of cryptographic logic 600, the randomness of random number generator 630 may not need to be particularly strong. Based on an output from random number generator 630, a vector generator 640 of cryptographic engine 600 may determine an initialization vector (IV)—e.g., where the IV is the random number itself.

In an embodiment, the IV may be selected or otherwise determined, based on the random number, from a sequence of vectors. For example, an EMD and a reader device may each be programmed or otherwise configured to identify (e.g., independently) the same sequence of vectors. The EMD and reader device may communicate with one another to identify which vector of the vector sequence is to serve as an initial vector for encrypting communications. In some embodiments, the EMD may be configured to selectively enable or disable a functionality to change an association of a particular vector to be used for cryptographic operations with a particular key value that is to be used for the same cryptographic operations. For example, cryptographic engine 600 may include or have access to information—e.g., stored in a lock mode register 650—indicating whether key repository 620 is currently capable of being updated to identify a different key and/or whether vector generator 640 is currently capable of being updated to identify a different vector. The EMD may limit access to lock mode register 650 to only certain types of communications. Although certain embodiments are not limited in this regard, a reader and EMD may, during operation of the EMD, each transition from using one vector in cryptographic operations to instead using a next vector of the sequence in later cryptographic operations. Successive transitions, each from a current vector to a next vector of the vector sequence, may be performed to aid in limiting access to the EMD by a malicious agent. The Counter Mode of AES cryptography is just one example of a mechanism that provides for such use of a vector sequence.

Figure 7A:
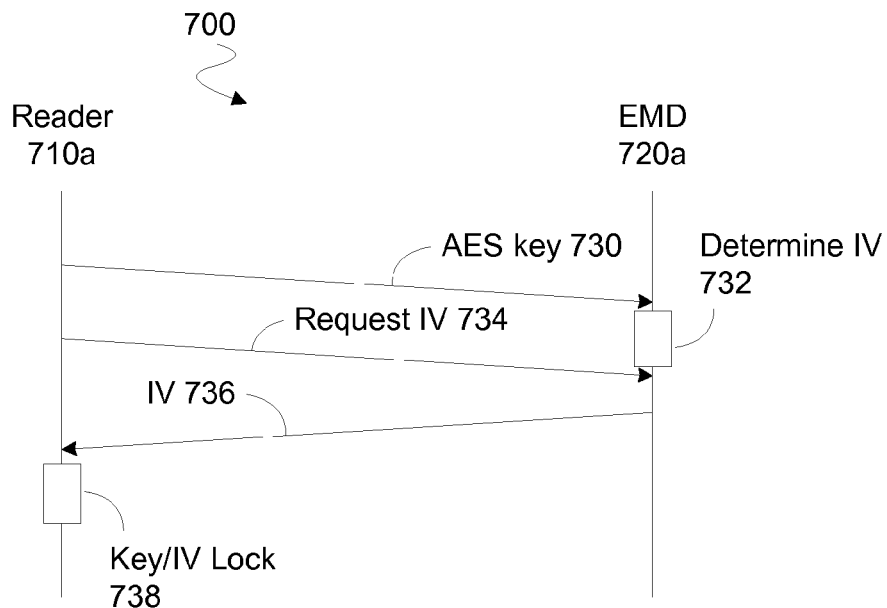
FIGS. 7A, 7B are swim-lane diagrams each illustrating respective communication exchanges performed with an eye-mountable device according to a corresponding embodiment.

FIG. 7A shows an exchange 700 between a reader 710a and an EMD 720a to configure cryptographic functionality according to an embodiment. Reader 710a and lens 720a may have some or all of the respective functionality of reader 105 and EMD 100, for example. In one embodiment, one or each of reader 710a and EMD 720a performs method 400. Exchange 700 may provide for pairing of reader 710a and EMD 720a with one another for secure communications. In one embodiment, at least some communications of exchange 700 are not secure, and rely upon a presumption that a secure environment exists. For example, exchange 700 may take place after EMD 720a is placed on an eye of a user. At this time, EMD 720a may be in an unlocked state that allows EMD 720a to be programmed with an association of a cryptographic key with a vector that is to be used in conjunction with that cryptographic key. For example, in response to a communication indicating that EMD 720a is on the eye of the user, reader 710a may send a plaintext communication 730 including an AES key (or other cryptographic key information). Reader 710a may further send a request 734 for an initialization vector that is to be used, in addition to the AES key, for later encrypted exchanges between reader 710a and EMD 720a.

At some point in time, e.g., in response to communication 730, EMD 720a may perform operations 732 to determine an IV. Although operations 732 are shown as being performed after communication 730 and before request 734, certain embodiments are not limited in either regard. Operations 732 may include calculating a vector based on a random number generated at EMD 720a or, alternatively, selecting a vector (e.g., randomly) from a predetermined sequence of vectors. EMD 720a may include registers or other integrated circuitry that is hardwired to specify or otherwise determine the sequence of vectors—e.g., independent of reader 710a and/or upon power-up of EMD 720a. After operations 732, EMD 720a may transit an IV 726 to reader 710a—e.g., in plaintext. In response to receiving IV 736, reader 710a may initiate operations 738 to lock an association of the AES key with IV 736 (or with another vector that is determined based on IV 736).

Figure 7B:
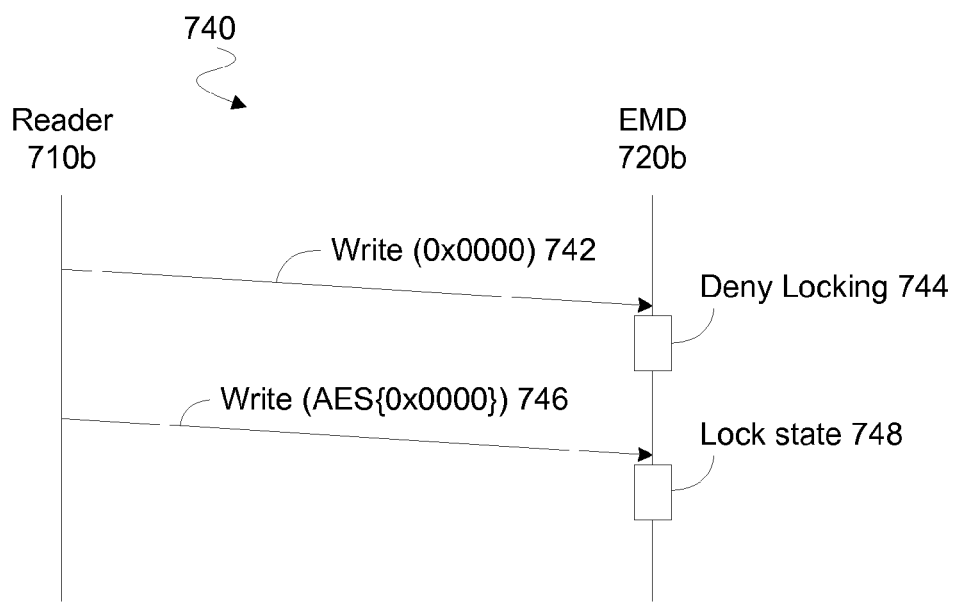

For example, FIG. 7B shows an exchange 700 between a reader 710b and an EMD 720b to lock (or alternatively, unlock) an association of a vector to a cryptographic key according to an embodiment. Reader 710b and EMD 720b may have some or all of the respective functionality of reader 710a and EMD 720a, for example. In one embodiment, one or each of reader 710b and EMD 720b performs method 400.

Exchange 740 may include a command 742 from reader 710b for EMD 720b to write to lock mode register 650 (or other such repository) information that is to define a configuration of EMD 720b. The configuration may include disablement (or alternatively, enablement) of a functionality to change an association of a cryptographic key and a vector with each other. By way of illustration and not limitation, a writing of a value (e.g., 0x0000) to a given register may disable such functionality, thereby fixing (or "locking") an association of a current key with a current vector. In an illustrative scenario according to one embodiment, such locking may be denied at 744 due, for example, to the data of command 742 being in a plaintext (unencrypted) format. For example, command 742 may be denied due to a decryption of the value 0x000 being some value that is not allowed to be written to a lock mode register. By contrast, reader 710b may instead send a command 746 including an AES (or other) encrypted version of a value to lock EMD 720b. In such an instance, data of command 746 may be decrypted at EMD 720b to determine the value 0x0000 that results in operations 748 for EMD 710b to lock the association of a cryptographic key with an IV (or other vector).

Figure 8:
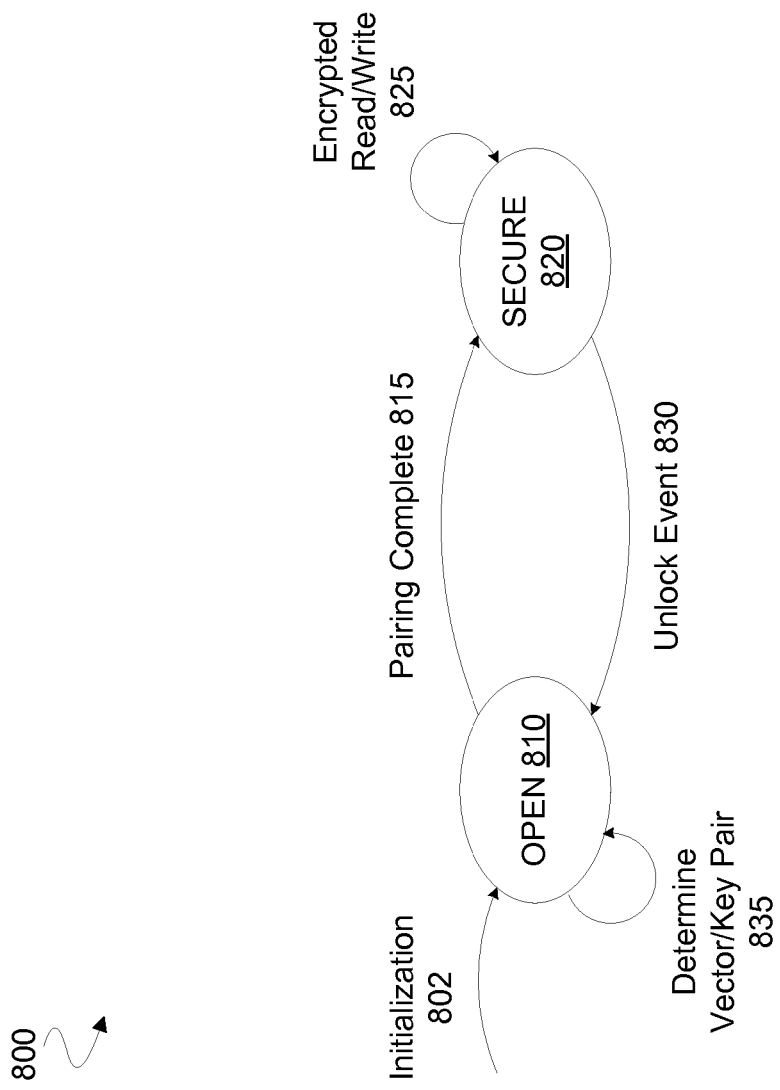
FIG. 8 is a state diagram illustrating operations of an eye-mountable device according to an embodiment.

FIG. 8 shows a state diagram 800 representing operational modes of an EMD according to an embodiment. State machine 800 may represent operation of some or all of EMD 100, EMD 200. EMD 710a or the like—e.g., where such operations are performed with control logic 170. State diagram 800 includes an OPEN state 810 (open state) during which the EMD may be programmed or otherwise configured to associate a particular key value with a vector that is to be used in conjunction with that key value for cryptographic operations. The EMD may transition to OPEN state 810 in response to one or more initialization events 802 including, for example, a power up of the EMD, placement of the EMD on an eye of the user, detection of a reader by the EMD and/or the like. During OPEN state 810, the EMD may perform operations 835 to determine a cryptographic key and a vector to correspond to that key.

State diagram 800 may further comprise a SECURE state 820 (locked state) during which an association of a key value and a vector is prevented from being deleted, updated or otherwise changed. For example, circuitry of the EMD may prevent one or each of a cryptographic key and/or a vector value from being replaced or updated during SECURE state 820. The EMD may transition from OPEN state 810 to SECURE state 820 in response to a completion 815 of operations that pair the EMD to an auxiliary device such as reader 105. The pairing operations may, for example, have some or all of the features of exchange 700 and/or write request 746. During SECURE state 825, one or more encrypted read or write exchanges 825 may take place between the EMD and the auxiliary device. The one or more encrypted exchanges 825 may include data encrypted using the cryptographic key and the vector determined by the pairing operations 835. In one embodiment, the EMD may transition from SECURE state 820 to OPEN state 810 in response to the EMD detecting a predefined unlock event 830. The unlock event 830 may include an explicit command from a reader—e.g., where the explicit command is at least partially encrypted and/or serves functionally as an inverse of write request 746. Alternatively or in addition, unlock event 830 may include an unauthorized or otherwise failed attempt by the reader or another remote device to access the EMD wirelessly.

In an embodiment, the EMD relies on an auxiliary device to identify an occurrence of an unlock event. For example, the auxiliary device may serve a master—and the EMD as a slave—at least with respect to determining whether the EMD is to be unlocked. Such an auxiliary device may further serve as a master to determine whether other cryptographic functionality of the EMD is to be enabled and/or disabled. Locating such master role functionality in the auxiliary device may allow for more space-efficient circuitry of the EMD—e.g., where a need for non-volatile memory at the EMD is reduced or eliminated. In an embodiment, the reader may be the only device, of the reader and the EMD, which includes non-volatile memory to store a cryptographic information and/or software instructions to perform operations that determine cryptographic processing.

Figure 9A:
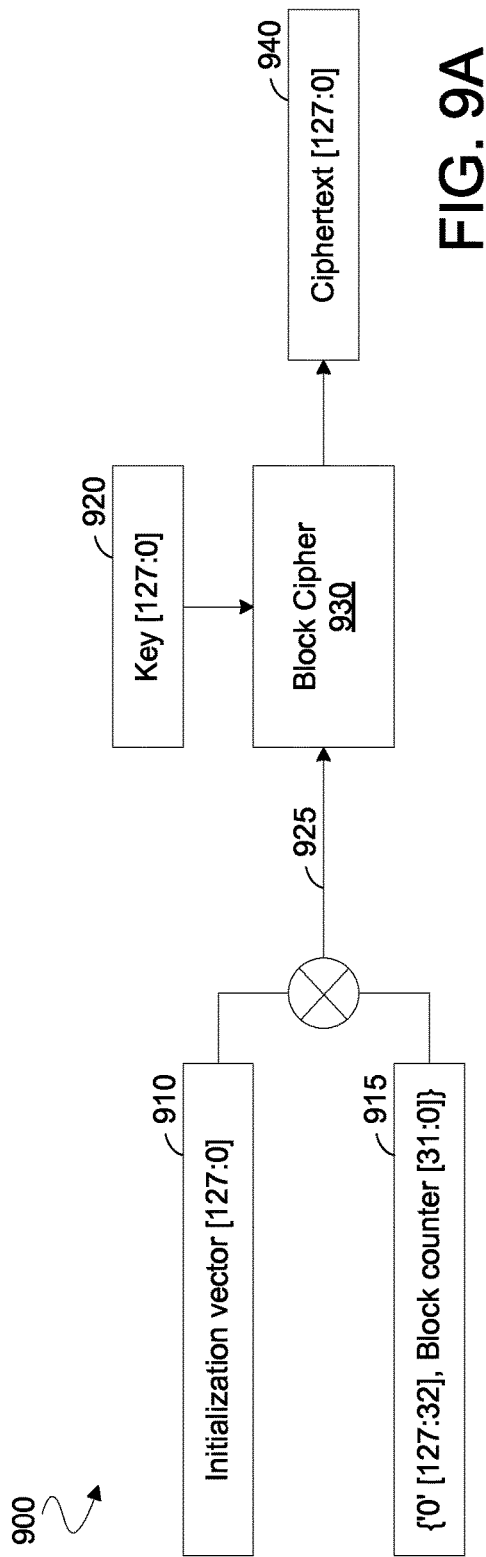
FIG. 9A is a functional block diagram illustrating elements of cryptographic logic according to an embodiment.

FIG. 9A illustrates cryptographic logic 900 to support communications exchanged with an EMD according to an embodiment. Cryptographic logic 900 may be provided at an EMD or an auxiliary device such as reader 105. For example, cryptographic logic 900 may include some or all of the features of cryptographic logic 600. Features of cryptographic logic 900 are described herein with reference to 128-bit AES cryptography. However, such description may be extended to additionally or alternatively apply to any of various other types of cryptography, as discussed herein.

Cryptographic logic 900 may include or otherwise have access to a 128-bit initialization vector 910 and counter information 915. Initialization vector 910 may include or otherwise be based on a random (or pseudo-random) number generated at the EMD. Counter information 915 may enable cryptographic logic 900 to transition through a sequence of vector values based on initialization vector 910. In an illustrative scenario according to one embodiment, some least significant bits (e.g., 32-bits) of counter information 915 store a current count value, where counter information 915 is left-padded with zero ('0') values. Vector 910 and counter information 915 may be XOR'ed (or otherwise processed) with each other to generate a 128-bit input vector value 925 to be provided to a block cipher 930 of cryptographic logic 900. Updating the vector value 925 may include incrementing, decrementing or otherwise changing counter information 915 according to a predefined sequence that is determined by both the EMD and an auxiliary device. Such changing of counter information 915 may be in response to an unlock event such as an explicit command from the reader, an unauthorized or otherwise failed attempt to access the EMD, or the like.

In an embodiment, block cipher 930 receives vector value 925 and a key value 920 that the EMD (and/or an auxiliary device) currently associates with vector value 925. Block cipher 930 may include circuitry, such as that of encryption/decryption engine 610, to perform AES (or other) encryption calculations and/or decryption calculations. For example, block cipher 930 may include a 128-bit AES core that, for example, outputs only 128-bit values. However, the arrangement of cryptographic logic 900 may allow for resource-efficient encryption/decryption processing. For example, some protocols—such as a Generation 2 EPC RFID protocol—typically use a smaller read/write word size (e.g., 16 bits). In typical communications according to these protocols, reads communications and/or write communications are typically exchange only a single word at a time. If these single word reads were directly passed to an AES core one at a time, computational operation of the AES core would be inefficient at least in terms of power and time. For example, the AES core would be encrypting a large number of padded bits (e.g., 112 bits, in the 16-bit read scenario) that would not have any functional purpose after final decryption.

Figure 10A:
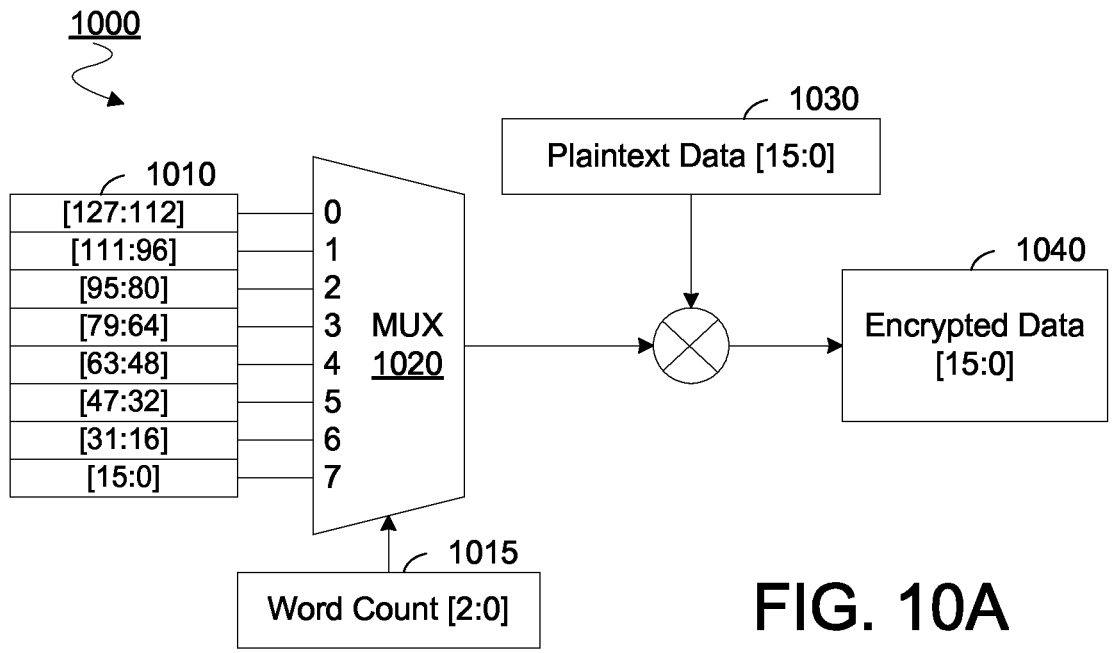
FIG. 10A is a block diagram illustrating elements of encryption logic according to an embodiment.

To avoid this, some embodiments instead operate a 128-bit AES core—e.g., of block cipher 930—once to produce 128-bits of ciphertext 940. The resulting ciphertext 940 may then be XOR'ed or otherwise processed with multiple words of plaintext data to generate an encrypted version of such data. By way of illustration and not limitation, FIG. 10A shows encryption logic 1000 including 128-bit ciphertext 1010 that, for example, includes ciphertext 940. Under control of a word count value 1015, a multiplexer (MUX) 1020 of encryption logic 1000 may sequentially pass individual words of ciphertext 1010 to be XOR'ed each with respective 16-bits of plaintext data 1030. For each such XOR'ing operation, a resulting output may then be provided as 16-bits of encrypted data 1040. The word count value 1015 may be repeatedly incremented (or decremented) to successively select each word of ciphertext 1010. After all words of ciphertext 1010 have been read, the AES core may be run again to determine a new 128-bit value of ciphertext 1040. In an embodiment, an EMD defers performing such encryption processing, for at least some requested data, until a total of 128 bits of data (e.g., eight 16-bit words) have been requested by the reader.

Figure 10B:
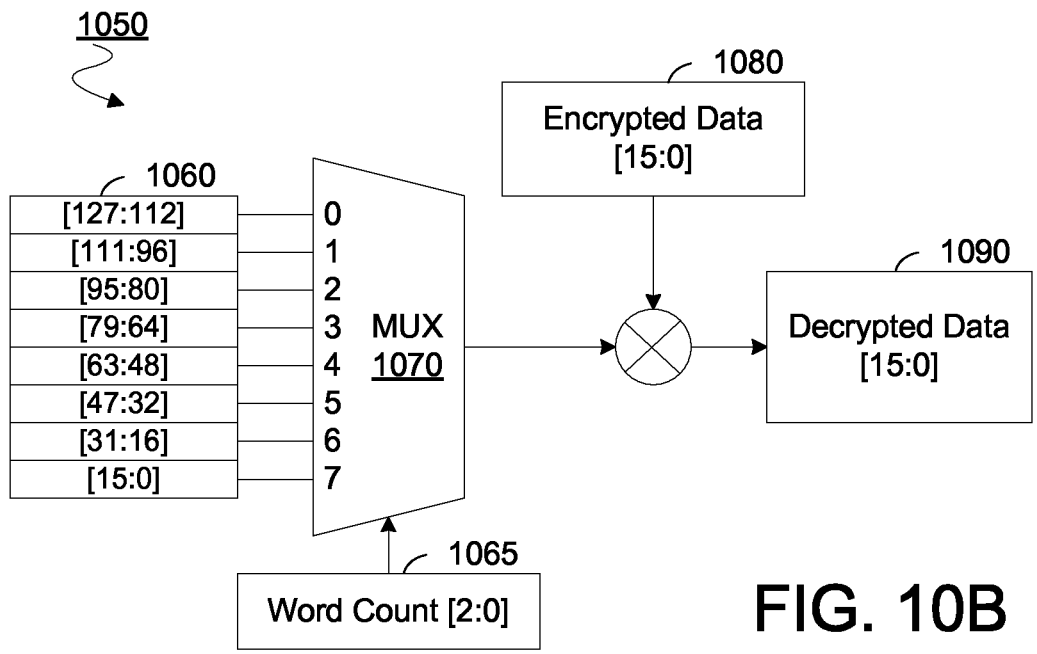
FIG. 10B is a block diagram illustrating elements of decryption logic according to an embodiment.

Alternatively or in addition, ciphertext 940 may be XOR'ed, or otherwise processed, with encrypted data to generate a decrypted (plaintext) version of that data. By way of illustration and not limitation, FIG. 10B shows decryption logic 1050 including 128-bit ciphertext 1060 that, for example, includes ciphertext 940. Under control of a word count value 1065, a MUX 1070 of encryption logic 1050 may sequentially pass individual words of ciphertext 1060 to be XOR'ed each with respective 16-bits of encrypted data 1080. For each such XOR'ing operation, a resulting output may then be provided as 16-bits of encrypted data 1090. The word count value 1065 may be repeatedly incremented (or decremented) to successively select each word of ciphertext 1060. After all words of ciphertext 1060 have been read, the AES core may be run again to determine a new 128-bit value of ciphertext 1090. In an embodiment, an EMD defers performing such decryption processing, for at least some received and buffered data, until a total of 128 bits of data have been received by the reader.

Figure 9B:
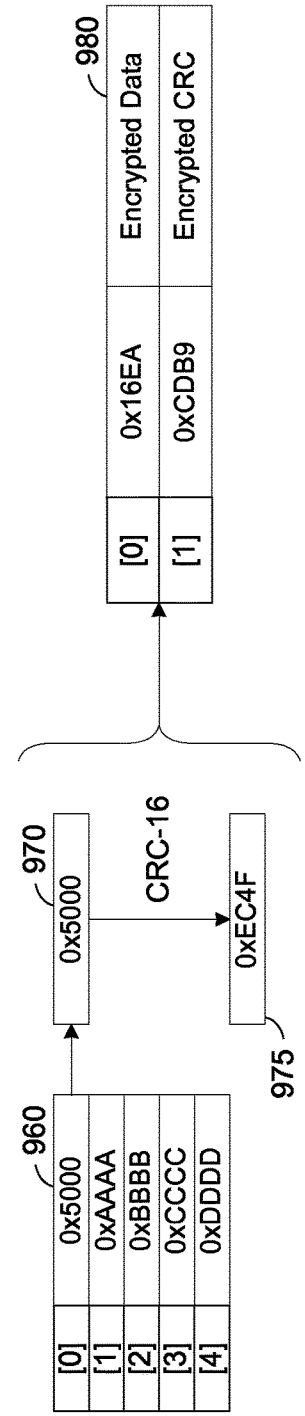
FIG. 9B is a diagram showing cryptographic processing to be performed according to an embodiment.

FIG. 9B shows processing 950 to improve security of a communication exchange performed with an EMD according to an embodiment. Processing 950 may be performed by an EMD—e.g., one of EMD 100 and EMD 200—or by reader 105 or other auxiliary device as described herein. In an embodiment, processing 950 avails of error detection techniques to further protect from malicious attacks that, for example, attempt to mimic encrypted data exchanged to or from the EMD. In an illustrative scenario according to one embodiment, processing 950 may include reading one or more words 970 of plaintext data 960 to be transmitted from the EMD. For example, a 16-bit cyclic redundancy check (CRC) value 975 or other error detection information may be calculated for one or more words 970 (e.g., including the illustrative word [1]). The one or more words 970 and the CRC value 975 may be encrypted—e.g. to generate words 980 including one or more words of encrypted data and another word of encrypted CRC information. Communications according to some protocols may need to be adapted to accommodate such encrypted CRC information. For example, a read message according to a Generation 2 EPC RFID protocol may need to explicitly request an additional word of encrypted CRC information, in addition to the one or more words of encrypted data being requested (where unencrypted CRC information is calculated based on a plaintext version of the one or more words of data).

Techniques and architectures for securing communications exchanged with an eye-mountable device are described herein. Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An eye-mountable device (EMD), comprising:
an enclosure material;
an accommodation actuator disposed within the enclosure material, wherein the accommodation actuator is coupled to adjust a level of accommodation of the EMD;
a controller disposed on a substrate within the enclosure material, wherein the controller includes one or more integrated circuits with associated logic that when executed by the controller causes the controller to perform operations including:
exchanging a wireless communication between the EMD and an auxiliary device via communication logic while the enclosure material is in direct contact with an eye of a user; and
performing a cryptographic operation via cryptographic logic to encrypt or decrypt data included in the wireless communication, wherein the data included in the wireless communication includes information describing the level of accommodation provided to the EMD by the accommodation actuator.

2. The EMD of claim 1, wherein the cryptographic operation is based on a symmetric private key cryptography scheme that includes cryptographic key and a vector, and wherein the cryptographic key is a symmetric key.

3. The EMD of claim 2, wherein the cryptographic logic includes a lock mode register to set permissions for changing an association of the cryptographic key with the vector, wherein the auxiliary device operates as a master to change the permissions set by the lock mode register, and the EMD is to operate as a slave to adjust the association of the cryptographic key with the vector based on a command from the auxiliary device.

4. The EMD of claim 1, wherein the cryptographic operation further includes:
generating a cipher based on a cryptographic key and a vector; and
performing an exclusive OR (XOR) operation based on a word of data and a portion of the cipher.

5. The EMD of claim 3, wherein the wireless communication includes a command to change the permissions set by the lock mode register, wherein the permissions fix the association of the cryptographic key with the vector.

6. The EMD of claim 1, wherein the cryptographic operation is compatible with an Advanced Encryption Standard (AES) specification.

7. The EMD of claim 6, wherein the cryptographic operation is based on 128-bit AES calculations.

8. The EMD of claim 2, wherein the EMD includes a random number generator to generate a random number, and wherein the vector is based on the random number.

9. The EMD of claim 1, further comprising an electrochemical sensor disposed on the substrate and including a working electrode and a reference electrode, the electrochemical sensor configured to generate a signal indicating a detection, with the working electrode and the reference electrode, of an analyte in a fluid disposed on the EMD.

10. The EMD of claim 1, wherein the data included in the wireless communication includes a command received from the auxiliary device to set the accommodation actuator to a specified accommodation level.

11. The EMD of claim 10, wherein the cryptographic operation includes decrypting the command with a cryptographic key and a vector, and in response changing the accommodation actuator to the specified accommodation level.

12. A method comprising:
exchanging a wireless communication between an eye-mountable device (EMD) and an auxiliary device via communication logic while the EMD is in direct contact with an eye of a user; and
performing a cryptographic operation via cryptographic logic to encrypt or decrypt data included in the wireless communication, wherein the data included in the wireless communication includes information describing a level of accommodation provided to the EMD by an accommodation actuator disposed within an enclosure material.

13. The method of claim 12, wherein the cryptographic operation is based on a cryptographic key and a vector, wherein the cryptographic logic includes a lock mode register to set permissions for changing an association of the cryptographic key with the vector, wherein the auxiliary device operates as a master to set the permissions of the lock mode register, and the EMD is to operate as a slave to adjust the association of the cryptographic key with the vector based on a command from the auxiliary device.

14. The method of claim 12, wherein the cryptographic operation further includes:
generating a cipher based on a cryptographic key and a vector; and
performing an exclusive OR (XOR) operation based on a word of data and a portion of the cipher.

15. The method of claim 13, wherein the wireless communication includes a command to set the permissions of the lock mode register, wherein the permissions fix the association of the cryptographic key with the vector.

16. The method of claim 12, wherein the cryptographic operation is compatible with an Advanced Encryption Standard (AES) specification.

17. A system comprising:
a reader device;
an eye-mountable device (EMD), comprising:
an enclosure material;
an accommodation actuator, having multiple accommodation states, disposed within the enclosure material, wherein each of the multiple accommodation states provides a level of accommodation of the EMD;
a controller disposed on a substrate within the enclosure material, wherein the controller includes one or more integrated circuits with associated logic that when executed by the controller causes the controller to perform operations including:
exchanging a wireless communication between the EMD and the reader device via communication logic while the enclosure material is in direct contact with an eye of a user; and
performing a cryptographic operation via cryptographic logic to encrypt or decrypt data included in the wireless communication, wherein the data included in the wireless communication includes information describing the level of accommodation provided to the EMD by the accommodation actuator.

18. The system of claim 17, wherein the cryptographic operation is based on an association that includes a cryptographic key and a vector, wherein the cryptographic logic includes a lock mode register to set permissions for changing the association of the cryptographic key with the vector, wherein the reader device operates as a master to set the permissions of the lock mode register, and the EMD is to operate as a slave to adjust the association of the cryptographic key with the vector based on a command from the auxiliary device.

19. The system of claim 17, wherein the cryptographic operation further includes:
   generating a cipher based on a cryptographic key and a vector; and
   performing an exclusive OR (XOR) operation based on a word of data and a portion of the cipher.

20. The system of claim 17, wherein the cryptographic operation is based on 128-bit Advanced Encryption Standard calculations.

21. One or more non-transitory computer-readable storage media having stored thereon instructions which, when executed by one or more processing units, cause the one or more processing units to perform a method comprising:
   exchanging a wireless communication between an eye-mountable device (EMD) and an auxiliary device via communication logic while the EMD is in direct contact with an eye of a user; and
   performing a cryptographic operation via cryptographic logic to encrypt or decrypt data included in the wireless communication, wherein the data included in the wireless communication includes information describing a level of accommodation provided to the EMD by an accommodation actuator disposed within an enclosure material.

22. The one or more non-transitory computer-readable storage media of claim 21, wherein the cryptographic operation is based on a cryptographic key and a vector, wherein the cryptographic logic includes a lock mode register to set permissions for changing an association of the cryptographic key with the vector, wherein the auxiliary device operates as a master to set the permissions of the lock mode register, and the EMD is to operate as a slave to adjust the association of the cryptographic key with the vector based on a command from the auxiliary device.

23. The one or more non-transitory computer-readable storage media of claim 21, wherein the cryptographic operation further includes:
   generating a cipher based on a cryptographic key and a vector; and
   performing an exclusive OR (XOR) operation based on a word of data and a portion of the cipher.

24. The one or more non-transitory computer-readable storage media of claim 21, wherein the cryptographic operation is based on 128-bit Advanced Encryption Standard calculations.

* * * * *